United States Patent
Hirano

(10) Patent No.: US 6,744,898 B1
(45) Date of Patent: Jun. 1, 2004

(54) PASSENGER SEAT WITH BUILT-IN SPEAKERS AND AUDIO SYSTEM THEREFOR

(75) Inventor: Yoshihiro Hirano, Tokyo (JP)

(73) Assignee: Pioneer Corporation, Tokyo (JP)

( * ) Notice: Subject to any disclaimer, the term of this patent is extended or adjusted under 35 U.S.C. 154(b) by 547 days.

(21) Appl. No.: 09/692,047

(22) Filed: Oct. 20, 2000

(30) Foreign Application Priority Data

Oct. 20, 1999 (JP) .............................. 11-297847

(51) Int. Cl.⁷ .................................... H04R 1/02
(52) U.S. Cl. ................ 381/333; 381/86; 381/301; 381/361
(58) Field of Search ................. 381/333, 301, 381/303, 304, 88, 86, 361; 297/397, 217.4

(56) References Cited

FOREIGN PATENT DOCUMENTS

| GB | 2224178 A | * | 4/1990 | ............ H04R/1/02 |
| JP | 401136843 A | * | 5/1989 | ............ B60R/11/02 |

* cited by examiner

*Primary Examiner*—Melur Ramakrishnaiah
(74) *Attorney, Agent, or Firm*—Sughrue Mion, PLLC

(57) ABSTRACT

A passenger seat with built-in speakers having a headrest and a pair of flaps located adjacent the headrest. The flaps are freely movable with respect to the headrest and provided with built-in speakers. The passenger seat with built-in speakers has a detector which detects a predetermined anglular position of the flap with respect to the headrest.

9 Claims, 5 Drawing Sheets

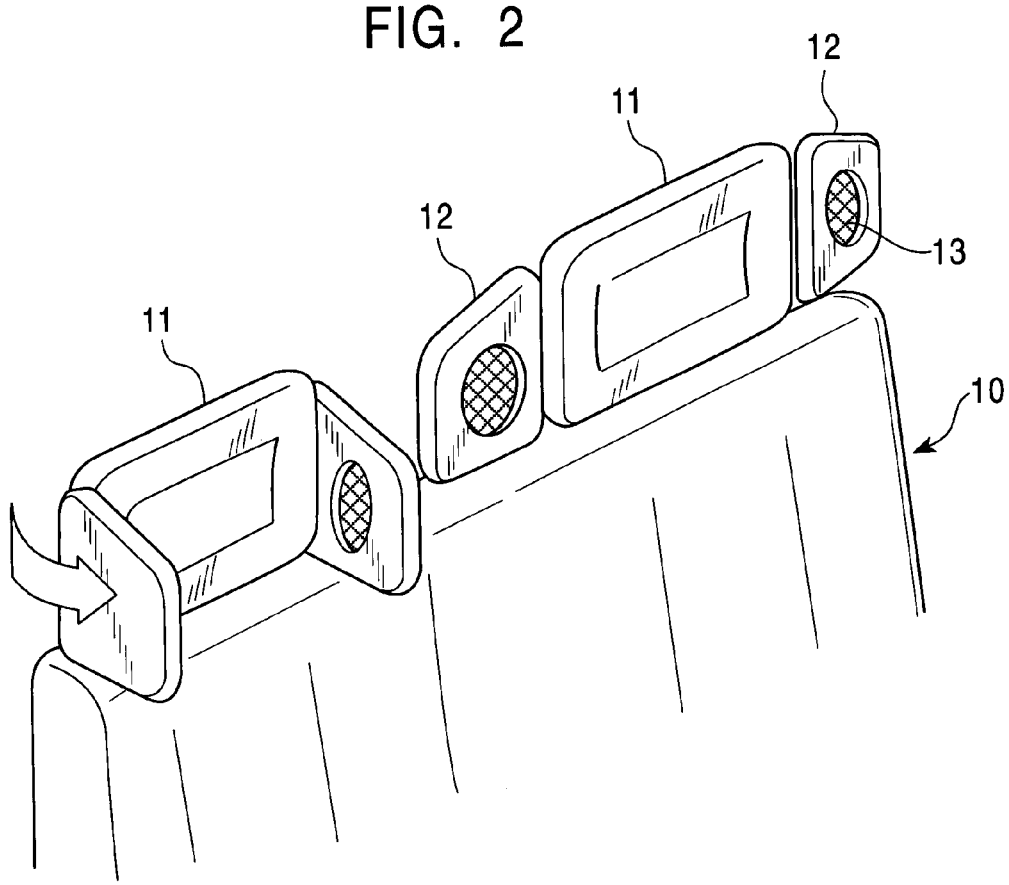

PASSENGER SEAT WITH BUILT-IN SPEAKERS AND AUDIO SYSTEM THEREFOR

BACKGROUND OF THE INVENTION

1. Field of the Invention

The present invention relates to an audio system which has built-in speakers provided for a passenger seat in a transportation means such as aircraft, railway passenger car and motor vehicle.

2. Description of the Related Art

Various audio systems have been proposed, each of which has built-in speakers provided for a passenger seat in a transportation means such as aircraft, railway passenger car and motor vehicle. FIG. 1 shows an example of such audio systems disclosed in Japan UM Kokai No.5-63358 wherein the system has a pair of speakers 6 and 6' provided in a passenger seat of a railway passenger car. The passenger seat includes a seat 1, a backrest 2, armrests 3, a central headrest 4 and a pair of side headrests 5. The audio system includes built-in speakers 6 and 6' which are respectively provided within the side headsets 5. When the audio system is not in use, the side headrests 5 are positioned in line with the central headrest 4 so that the speakers 6 are covered by the the side surfaces of the central headrest 4. When the side headrests 5 are pulled forward to be tilted around pivot parts 7 by the user, the speakers 6 are positioned so as to cover the user's ears. With the side headrests 5 being partly pulled forward from the central headrest 4 so as to expose half of the speakers 6, for example, the sound volume from the speakers 6 can be adjusted without the operation of the volume control of the control panel.

In the above audio system, however, the listener has to pull the side headrest 5 forward to a predetermined position before turning ON a power source. Moreover, when the listener finishes listening to the music program, he has to turn OFF the power source and push back the side headrest 5 to the original position, which is a cumbersome task.

OBJECTS AND SUMMARY OF THE INVENTION

The invention has been made in view of the above problem, and it is an object of the invention to provide an audio system which is simple to use.

To attain the above object, according to the first aspect of the invention, there is provided a passenger seat having a headrest and a pair of flaps located adjacent sides of the headrest, the pair of flaps being movable with respect to the headrest and speakers provided in the flaps comprising detection means for detecting a predetermined anglular position of the flaps with respect to the headrest.

According to the second aspect of the invention, there is provided a passenger seat with built-in speakers as claimed in claim 1 wherein the detection means comprises a detecting member which moves according to movement of the pair of flaps and a sensor which detects an anglular predetermined position of the detecting member.

According to the third aspect of the invention, there is provided a passenger seat with built-in speakers as claimed in claim 2 wherein the sensor is a mechanical switch which operates when the detecting member moves to the predetermined anglular position so as to contact the sensor.

According to the fourth aspect of the invention, there is provided a passenger seat with built-in speakers as claimed in claim 1 further comprising a linkage member connecting the flaps and the detecting means detects the predetermined anglular position of one of the flaps.

According to the fifth aspect of the invention, there is provided an audio system comprising a passenger seat with built-in speakers comprising a supplying means providing acoustic power to the speakers when the detection means detects that the flaps are in the predetermined angular position.

BRIEF EXPLANATION OF THE DRAWINGS

FIG. 2 is a perspective view of the headrest and its side flaps of the passenger seat with built-in speakers according to the present invention;

DETAILED DESCRIPTION OF THE PREFERRED EMBODIMENT

Figure 1:
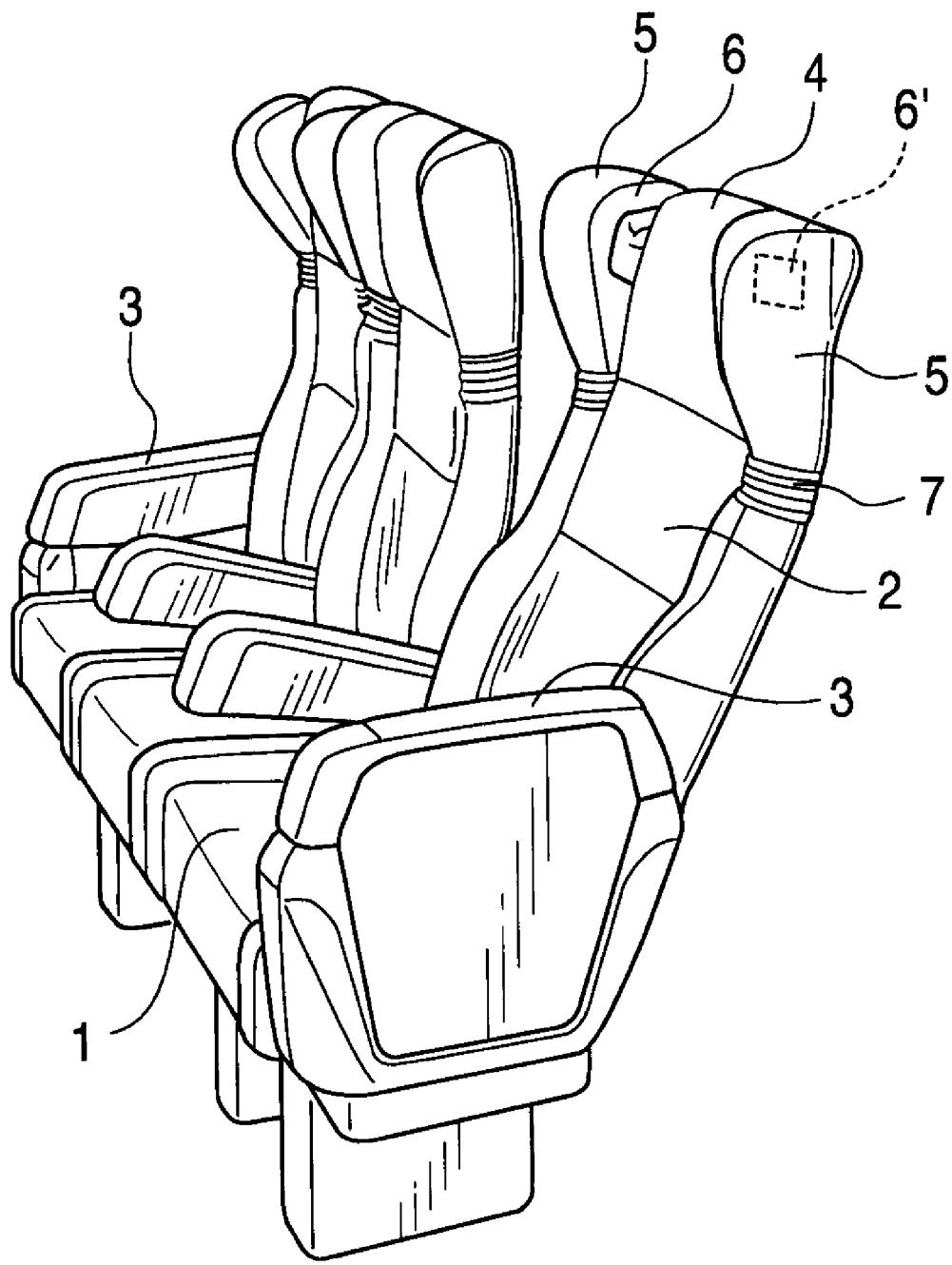
FIG. 1 is a schematic view of a prior art of an audio system with speakers built into a passenger seat of a railway passenger car.

Embodiments of the passenger seat with built-in speakers and the audio system therefor according to the invention will be explained in the following with reference to the drawings.

FIG. 2 is a perspective view showing a main part of a passenger seat with built-in speakers 10 according to the invention. The passenger seat 10 with built-in speakers is exemplified as a two-seater seat having two headrests 11 disposed adjacently to each other. On both of the right and left sides of the headrest 11, there is provided a pair of movable side headrests or side flaps 12. A speaker 13 is provided in each of the side flaps 12. Each of the side flaps 12 is configured such that it is movable from a position in which it is disposed in line with the headrest 11 to a position in which the side flaps 12 are disposed approximately perpendicular to the headrest 11 for the user to listen to a music program.

Figure 3A:
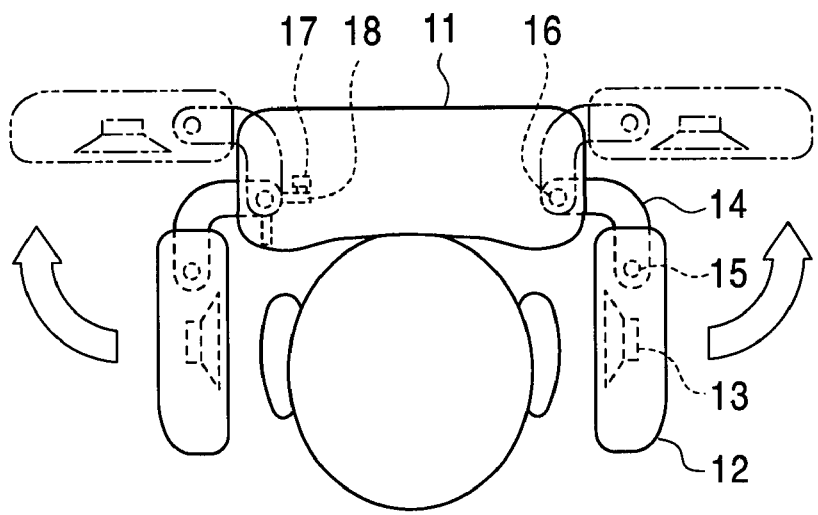
FIG. 3A is a schematic plan view showing the structure of the headrest and its side flaps of the passenger seat with built-in speakers according to the present invention.

In detail, as shown in FIG. 3A, each of the side flaps 12 on the right and left sides constituting the passenger seat with built-in speakers 10 is coupled to the headrest 11 by a pair of L-shaped arms 14. The L-shaped arm 14 is secured to the side flap 12 with a securing pin 15 at one end and is pivotally secured to the headrest 11 with a supporting pin 16 at the other end so as to be rotatable. This allows each side flap 12 to turn about 90° from an unused position in which the side flap 12 is disposed in line with the headrest 11 to a used position in which the side flap 12 is disposed to be approximately perpendicular to the headrest 11. A pair of the L-shaped arms 14 secured to the side flaps 12 on the right and left sides of the headrest 11, respectively, are linked to each other in the headrest 11 with a linking arm which is not shown. Therefore, with one of the side flaps 12 turned from the unused position to the used position, for example, the other side flap 12 is turned in the same manner as the former one by the linking arm. That is, the side flaps 12 are pivotally secured to the headrest 11 to move symmetriacally with respect to the central portion(the position for supporting the user's head) of the headrest 11.

Figure 3B:
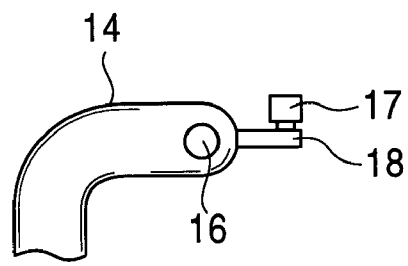
FIG. 3B is a segmentary view showing the end portion of the L-shaped arm which secures the side flaps to the headrest.
Figure 3C:
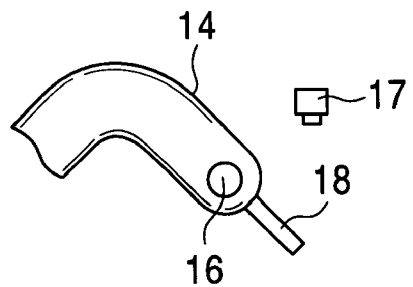
FIG. 3C is a segmentary view showing the end portion of the L-shaped arm in the unused position.

A protrusion 18 is formed on the headrest 11 side end of the L-shaped arms 14 for turning ON and OFF a mechanical switch 17. The mechanical switch 17 is provided as detection means for detecting that each of the side flaps, i.e. the speakers 13 is positioned at a predetermined position with respect to the headrest 11. With the side flap 12 in the used position, the protrusion 18 on the L-shaped arm 14 presses the mechanical switch 17 to "ON" as shown in FIG. 3B. While, with the side flap 12 swiveleded from the used position to the unused position, the protrusion 18 on the L-shaped arm 14 is detached from the mechanical switch 17 to turn it "OFF" as shown in FIG. 3C. When the listener sitting on the passenger seat with built-in speakers 10 moves the side flaps 12 from the unused position to the used position (the position in which the side flaps 12 cover both ears of the listener) with the listener's head supported on the headrest 11, the mechanical switch 17 is turned ON. With the mechanical switch 17 turned ON, music is provided from the right and left speakers 13 connected to an audio system 30 to be described later.

Figure 4:
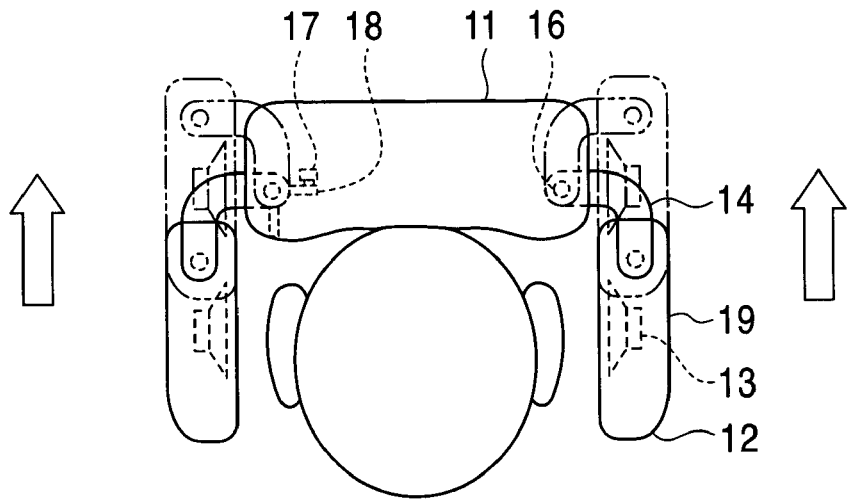
FIG. 4 is a schematic plan view showing another embodiment of the passenger seat with built-in speakers according to the present invention.

In another embodiment, the passenger seat 10 with built-in speakers may be constituted so that the side flaps 12 move back and forth along respective sides of the headrest 11 as shown in FIG. 4. In the embodiment, the L-shaped arm 14 is pivotally secured to the side flap 12 with a holding pin 19 at one end thereof so as to be rotatable, and is pivotally secured to the headrest 11 with a supporting pin 16 at the other end so as to be rotatable. This allows the side flaps 12 to be movable back and forth along the respective sides of the headrest 11. A pair of the L-shaped arms 14 pivotally secured to the side flaps 12 on the right and left sides of the headrest 11, respectively, are linked to each other in the headrest 11 with a linking arm so that with one of the side flaps 12 moved, the other flap 12 is moved in the same manner as the former one by the linking arm.

Figure 5:
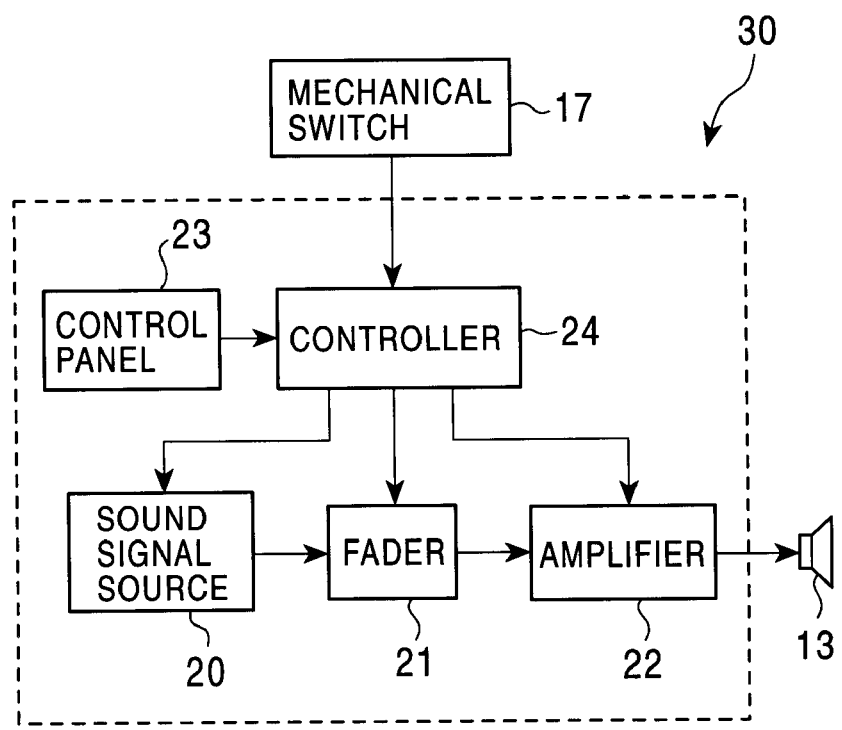
FIG. 5 is a block diagram showing an audio system according to the present invention.

Next, the configuration of audio system 30 of the invention will be explained with reference to a block diagram shown in FIG. 5.

The audio system 30 includes an audio signal source 20 such as a compact disk (CD) or a receiver, a fader 21 which gradually increases or decreases the signal output from the audio signal source 20, an amplifier 22 which amplifies the signal outputted from the audio signal source 20, a control panel 23 which is used for sound volume adjustment and for selecting an audio signal source such as a played back CD, and a controller 24 which controls the audio system 30. A detection signal supplied from the mechanical switch 17 inside the headrest 11 is provided to the controller 24. The signal emitted from controller 24 is provided to amplifier 21 which is connected to the speakers 13 provided in the respective side flaps 12.

Figure 6:
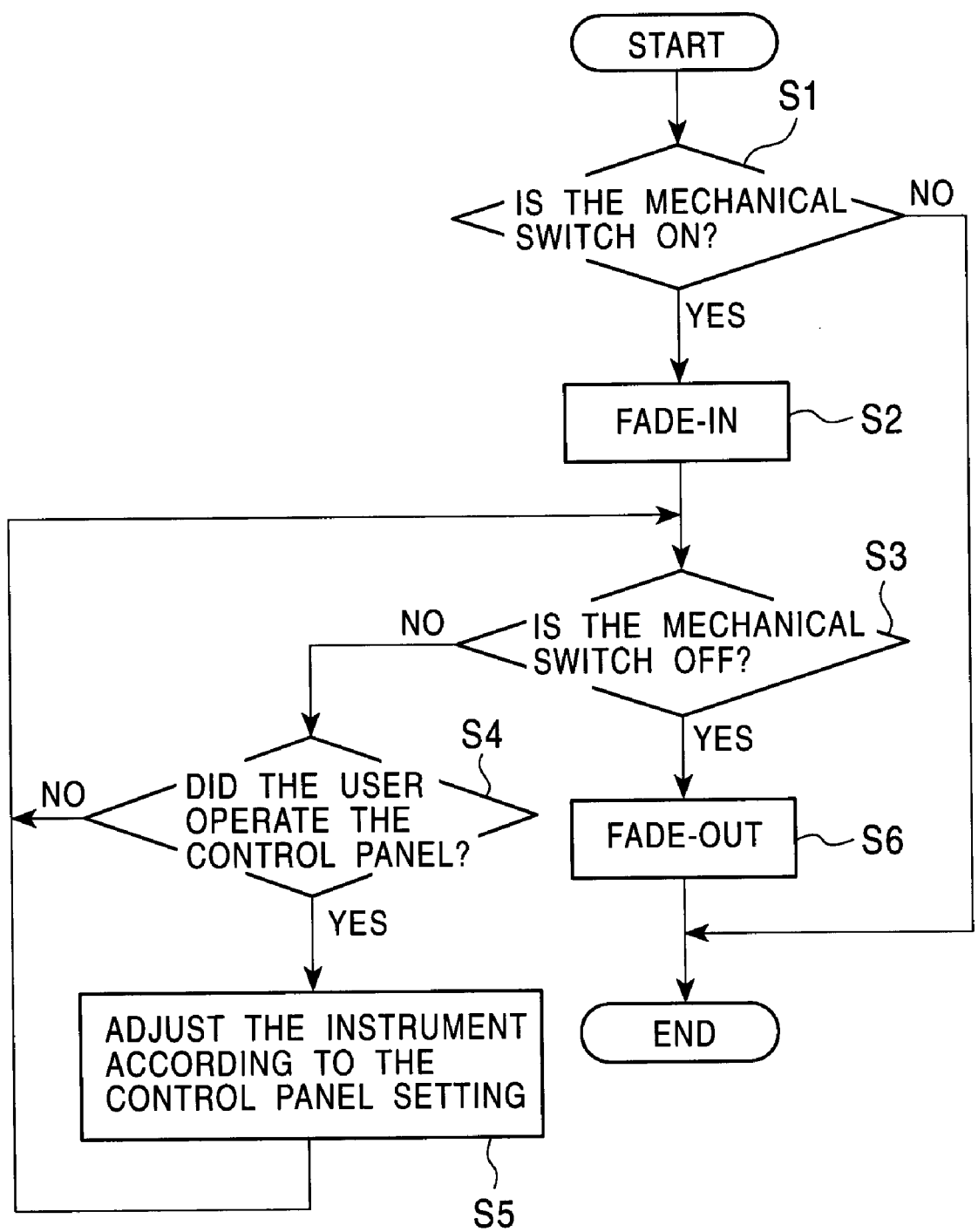
FIG. 6 is a flow chart which shows the operation of the the passenger seat with built-in speakers and the audio system therefor according to the present invention.

Operation of the passenger seat with built-in speakers 10 and the audio system 30 therefor according to the invention will be explained with reference to the flow chart shown in FIG. 6.

When the user sits in seat 10 with his head supported on the headrest 11 and moves the side flaps 12 from the unused position to the used position, the mechanical switch 17 is turned on to actuate the audio system 30, i.e., the aoudio signal power is supplied to the speaker 13 via the fader 21 and the amplifier 22.

Then, in step S1, the controller 24 monitors whether or not the detection signal is supplied from the mechanical switch 17. When detection signal is not supplied from the mechanical switch 17 (NO), monitoring is terminated. The controller 24 performs this monitoring at a predetermined cycle (2 seconds, for example). When the controller 24 receives a signal indicating that the mechanical switch 17 is turned ON (YES), then a fade-in operation is carried out in step S2.

The audio system 30 is configured to always provide a music program from the audio signal source 20 selected by the user so that when the fader 21 is turned ON to carryout a fade-in operation, the selected music program is performed through speakers 13 with the volume gradually being increased. The fader 21 increases the sound volume to a level predetermined by the user.

In step S3, the controller 24 monitors whether or not an off signal is supplied from the mechanical switch 17. When the OFF signal is supplied from the mechanical switch 17 (YES), then the fader 21 operates to carry out a fade-out operation to gradually decrease the sound volume. The operation is then terminated. When an off signal is not supplied (NO), controller 24 further determines whether or not the control panel 23 is operated by the user in step S4.

In step S4, when the control panel 23 is not operated (NO), then the operation in step S3 is performed. When the user operates the control panel 23 (YES), then the music program of the audio signal source 20 is changed or the sound level is adjusted in accordance with the setting of the control panel 23 reflecting the user's operation, in step S5. Thereafter the operation in step S3 is performed.

While the audio system 30 is in use, the controller 24 always monitors a signal from the mechanical switch 17 or the control panel 23 to comply with the user's demand.

The user may provide the audio signal source 20 with a CD changer that randomly reproduces various music programs or with a plurality of CD changers each with a different music category the selection of which is left to the user. The user may carry out the opearation by operating the control panel 23. The content of operation such as selection of the music category or volume adjustment may be stored in the RAM(not showm) of the controller 24. This allows the user to listen to the music with the volume preset in the RAM without operatiing the control panel 23. When a visual display is provided in addition to the audio program, the system may be configured so as to turn on and off the monitor display in accordance with the on/off of the mechanical switch 17.

According to the invention, with the user sitting in the passenger seat 10 provided with built-in speakers and moving one of the side flaps 12 from the unused position, both of the side flaps 12 on the right and left are moved together to the positions for covering the user's ears. This turns the mechanical switch 17 on to gradually increase the volume from both speakers 13 provided in the respective side flaps 12 until the user can enjoy a music program with a predetermined sound volume level. When the user does not care to listen to the music, the user moves one of the side flaps 12 backward, by which both of the side flaps 12 are moved backward together to uncover the user's ears while the sound level of the music fades out. Thus, the audio system is simple to handle, and does not interfere with the user sitting in the seat.

While the invention has been particularly shown and described with reference to preferred embodiments thereof, it will be understood by those skilled in the art that the foregoing and other changes in form and details can be made therein without departing from the spirit and scope of the invention.

What is claimed is:

1. An audio system comprising:

a passenger seat having a headrest, a pair of flaps respectively located on adjacent sides of said headrest, and speakers respectively provided in said flaps, said flaps being movable with respect to said headrest;

detection means for detecting that either one of said flaps reaches a predetermined position with respect to said headrest; and power supplying means for supplying an acoustic power to said speakers while gradually increasing a level of the acoustic power when said detection means detects that either one of said flaps reaches said predetermined position.

2. An audio system as claimed in claim 1, wherein said detection means includes a detecting member which moves along with movement of said flaps, and a switch which is driven when said detecting member reaches a position corresponding to said predetermined position.

3. An audio system as claimed in claim 2, wherein said switch is a mechanical switch which is driven when said detecting member reaches said predetermined position to contact said switch.

4. An audio system as claimed in claim 2, wherein said detecting member includes an L-shaped arm and a protrusion formed on the end of said L-shaped arm.

5. An audio system as claimed in claim 1, further comprising a linkage member connecting said flaps.

6. An audio system as claimed in claim 1, wherein said power supplying means supplies the acoustic power to said speakers while gradually decreasing a level of the acoustic power when said detection means detects that either one of said flaps departs from said predetermined position.

7. An audio system as claimed in claim 1, wherein each of said flaps is movable between said predetermined position and an unused position in which each of said flaps is not detectable by said detection means.

8. An audio system as claimed in claim 1, wherein said detection means is provided in each of said flaps.

9. An audio system as claimed in claim 1, wherein said power supplying means has such a level as to cause said speaker to emit a sound when said flap is held in said predetermined position, and said power supplying means has such a level as to cause said speaker not to emit a sound when said flap is held in an unused position in which said flap is not detectable by said detection means.

* * * * *